United States Patent
Ramsay

(10) Patent No.: US 8,046,519 B2
(45) Date of Patent: Oct. 25, 2011

(54) COUPLING A SPECIALTY SYSTEM, SUCH AS A METERING SYSTEM, TO MULTIPLE CONTROL SYSTEMS

(75) Inventor: Lawson H. Ramsay, Camelon (GB)

(73) Assignee: Daniel Measurement and Control, Inc., Houston, TX (US)

( * ) Notice: Subject to any disclaimer, the term of this patent is extended or adjusted under 35 U.S.C. 154(b) by 148 days.

(21) Appl. No.: 12/254,274

(22) Filed: Oct. 20, 2008

(65) Prior Publication Data

US 2010/0100654 A1   Apr. 22, 2010

(51) Int. Cl.
*G06F 13/36* (2006.01)

(52) U.S. Cl. .............. 710/315; 710/8; 710/11; 710/305; 710/306; 700/2; 700/4; 700/9; 700/19; 700/26; 700/83; 700/129; 700/282

(58) Field of Classification Search ............ 710/11, 710/315, 8, 305, 306; 700/2, 4, 9, 19, 26, 700/83, 129, 282
See application file for complete search history.

(56) References Cited

U.S. PATENT DOCUMENTS

| | | | | |
|---|---|---|---|---|
| 4,078,427 A * | 3/1978 | Yoshida et al. | ............. | 73/861.28 |
| 4,855,905 A * | 8/1989 | Estrada et al. | ................ | 709/246 |
| 5,613,096 A * | 3/1997 | Danknick | ................. | 709/236 |
| 5,801,942 A * | 9/1998 | Nixon et al. | ................... | 700/83 |
| 5,842,039 A * | 11/1998 | Hanaway et al. | ............... | 710/11 |
| 5,918,068 A * | 6/1999 | Shafe' | ............................ | 710/11 |
| 5,923,557 A * | 7/1999 | Eidson | .......................... | 700/129 |
| 6,032,203 A * | 2/2000 | Heidhues | ........................ | 710/11 |
| 6,151,640 A * | 11/2000 | Buda et al. | ...................... | 710/11 |
| 6,266,726 B1 * | 7/2001 | Nixon et al. | .................. | 710/105 |
| 6,272,400 B1 * | 8/2001 | Jankins et al. | ................. | 700/282 |
| 6,278,697 B1 * | 8/2001 | Brody et al. | ................... | 370/310 |
| 6,446,202 B1 * | 9/2002 | Krivoshein et al. | ............... | 713/1 |
| 6,449,715 B1 * | 9/2002 | Krivoshein | ......................... | 713/1 |
| 6,618,745 B2 * | 9/2003 | Christensen et al. | .......... | 709/201 |
| 6,839,790 B2 * | 1/2005 | Barros De Almeida et al. | ............................. | 710/305 |
| 6,959,356 B2 * | 10/2005 | Packwood et al. | ............ | 710/315 |
| 6,973,508 B2 * | 12/2005 | Shepard et al. | ................... | 710/8 |
| 6,973,658 B2 * | 12/2005 | Nguyen | ......................... | 719/327 |
| 7,051,143 B2 * | 5/2006 | White et al. | ................... | 710/305 |
| 7,076,310 B2 * | 7/2006 | Fehrer et al. | ...................... | 700/1 |

(Continued)

OTHER PUBLICATIONS

Fuji Electric Systems Co., Ltd. Ultrasonic Flowmeter (Portaflow-C). Data Sheet. Dec. 25, 2007.*

(Continued)

*Primary Examiner* — Matthew Spittle
(74) *Attorney, Agent, or Firm* — Mark E. Scott; Conley Rose, P.C.

(57) ABSTRACT

A metering system configured to couple to multiple specialty systems, such as a control system. At least some of the illustrative embodiments are processing units comprising a processor, a memory coupled to the processor, and a communication port configured to coupled to a backbone communication network of a control system. The memory stores a program that causes the processor to selectively participate (over the communication port) as a processing unit of a control system of a first manufacturer (the control system implements a first proprietary communication protocol between processing units), and to participate (over the communication port) as a processing unit of a control system of a second manufacturer different than the first manufacturer (the control system of the second manufacturer implements a second proprietary communication protocol between the processing units).

13 Claims, 6 Drawing Sheets

U.S. PATENT DOCUMENTS

| | | | |
|---|---|---|---|
| 7,096,078 B2 * | 8/2006 | Burr et al. .................. | 700/83 |
| 7,155,499 B2 * | 12/2006 | Soemo et al. .................. | 709/223 |
| 7,181,550 B2 * | 2/2007 | Shepard et al. .................. | 710/8 |
| 7,206,646 B2 | 4/2007 | Nixon | |
| 7,228,186 B2 * | 6/2007 | Karschnia et al. .............. | 700/19 |
| 7,426,452 B2 * | 9/2008 | Zielinski et al. .............. | 702/184 |
| 7,865,251 B2 * | 1/2011 | Law et al. .................. | 700/19 |
| 2004/0107287 A1 | 6/2004 | Ananda | |
| 2004/0138786 A1 * | 7/2004 | Blackett et al. .............. | 700/295 |
| 2004/0196865 A1 | 10/2004 | Natarajan | |
| 2007/0245360 A1 | 10/2007 | Alexander | |

OTHER PUBLICATIONS

3Com Corporation. 3Com Megahertz 10/100 LAN CardBus PC Card. User Guide. Jun. 2000.*

Merriam Webster. metrology. www.m-w.com. Viewed Apr. 8, 2011.*

Merriam Webster. audit. www.m-w.com. Viewed Apr. 8, 2011.*

Reyes et al. Natural gas flow computer with open architecture using intelligent instrumentation and field bus. The Instrumentation, Systems, and Automation Society. 2003.*

Siemens. SITRANS F flowmeters. System info and selection guide. 2007.*

Vincent, Sean. Foundation Fieldbus High Speed Ethernet Control System. Fieldbus Inc. 2001.*

Tridium Inc. Control System Independence. 1999.*

Helson, Ron. HART Communication: Driving New Product Developments. HART Communication Foundation. 2009.*

PCT Search Report and Written Opinion for PCT Patent Application No. PCT/US2009/050718, filed Jul. 15, 2009.

* cited by examiner

COUPLING A SPECIALTY SYSTEM, SUCH AS A METERING SYSTEM, TO MULTIPLE CONTROL SYSTEMS

BACKGROUND

Manufacturers of distributed process control systems design their control systems to be used with a variety of industrial processes. For example, the general hardware and software that a distributed process control system manufacturer may create may be used in such diverse applications as running a power plant to controlling a food processing facility. For this reason, the manufacturers of the distributed process control systems intentionally create their systems to be easily adaptable to a plurality of different controlled processes.

However, there are niche markets in the process control realm for which general process control systems are not particularly suited. For example, the measurement of the flow of hydrocarbons (e.g., natural gas, liquefied natural gas, oil, gasoline) for purposes of custody transfer is a niche market for which the general tools provided in a distributed process control system are inadequate. Stated otherwise, while some distributed process control systems may have function blocks to perform flow measurement calculations, the flow measurement calculations provided are not of sufficient accuracy for custody transfer (i.e., billing) purposes. Moreover, many legal jurisdictions have regulatory audit requirements regarding the measurement of the flow of hydrocarbons, and the general tools for flow measurement calculations of process control systems do not meet such requirements. As yet another example of a niche market for which distributed process control systems are not particularly suited is turbine (e.g., gas turbine, steam turbine) control. Turbine control systems control not only valve position for turbine speed/load control, but also implement various specialty functions like heat soaking a turbine for proper expansion of the various components after periods of inactivity, and in the case of gas turbines fuel flow control. As yet another example of a niche market for which a distributed process control systems are not particularly suited is hydrocarbon quality monitoring (e.g., BTU content, hydrocarbon makeup, entrained liquid in natural gas flow), and some legal jurisdictions also have specific metrological requirement regarding quality monitoring.

Because of the complexity and requirements regarding specialty systems, such as metering of hydrocarbons for custody transfer, turbine control, and hydrocarbon quality monitoring, in the related art the specialty systems are separate physical systems.

BRIEF DESCRIPTION OF THE DRAWINGS

For a detailed description of exemplary embodiments, reference will now be made to the accompanying drawings in which.

NOTATION AND NOMENCLATURE

Figure 1:
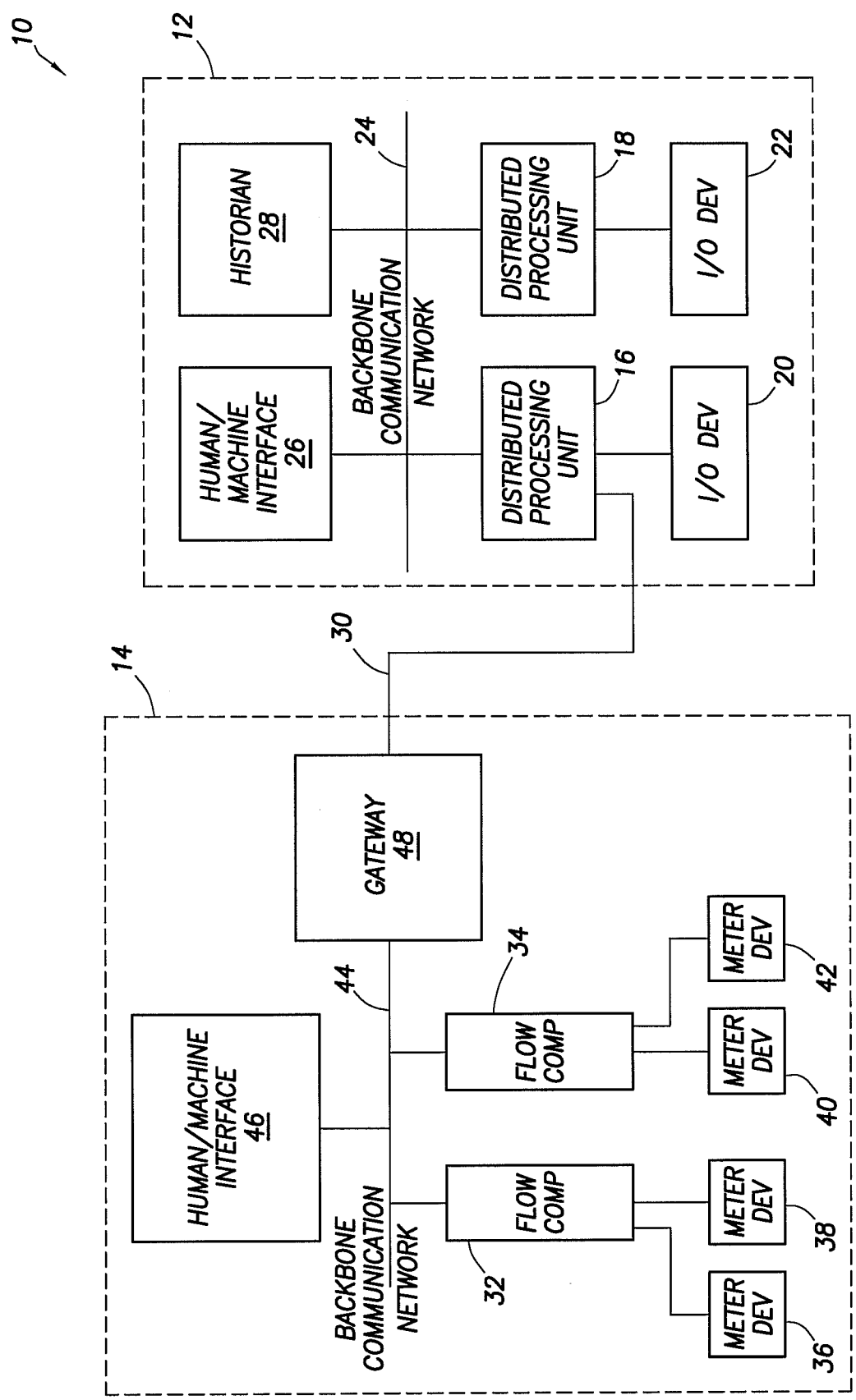
FIG. 1 illustrates an overall system having substantially independent control system portions and metering system portions.

Certain terms are used throughout the following description and claims to refer to particular system components. As one skilled in the art will appreciate, manufacturers of distributed process control equipment may refer to a component by different names. This document does not intend to distinguish between components that differ in name but not function.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices and connections.

"Flow computer" shall mean a hardware device having a processor and executing software where the flow computer communicates directly or indirectly with fluid flow measuring equipment (e.g., ultrasonic flow meters, transmitters associated with an orifice plate). The flow computer may also calculate fluid flow (e.g., in the case of an orifice plate), and the flow computer further accumulates flow values over one or more metering runs. The flow computer can be a dedicated device, or a virtual device executed in a processing unit performing other functions as well, such as functions related to metrological audit requirements.

"Backbone communication network of a control system" shall mean the communication network across which processing units (e.g., distributed processing units, human/machine interfaces, historian units programmable logic controllers (PLCs)) communicate with each other, and "backbone communication network of a control system" shall be distinguished from the networks which couple I/O devices to field devices (e.g., HART, Modbus).

"Participate as a processing unit within a control system" shall mean that the control system can determine the presence of function blocks executing in the processing unit coupled by way of the backbone communication network, and that the control system can generate visual displays of the function blocks.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Before turning to the specifics of the various embodiments, it is noted that this specification discusses combining of a control system with a specialty system. The developmental context of the various embodiments was with respect to the specialty system being a hydrocarbon metering system, and thus the Detailed Description is discussed mostly in reference to the developmental context; however, after understanding the principles of operation described herein, the principles may be equivalently extended to other specialty systems, such as turbine control systems, diagnostic and monitoring packages, and hydrocarbon quality monitoring.

FIG. 1 illustrates an overall system 10 comprising a control system 12 (e.g., a distributed process control system) and a separate metering system 14. The control system 12 comprises an illustrative two distributed processing units 16 and 18. Each distributed processing unit 16, 18 couples to one or more input/output (I/O) devices 20 and 22 respectively. Each distributed processing unit 16, 18 executes control software that monitors parameters of a physical process by way of the I/O devices, calculates control output values regarding the physical process, and drives output values to the I/O devices 20, 22. The distributed processing units exchange indications of operating functions blocks, and data values associated with the function blocks, with each other and other devices over the backbone communication network 24. For example, a human/machine interface 26 may couple to the backbone communication network 24, and the human/machine interface 26 may enable a user to program the distributed processing unit 16, 18 and/or monitor process parameters. Likewise, a historian unit 28 may couple to the backbone communication network 24.

Still referring to FIG. 1, while a control system 12 of the related art may have the ability to perform flow measurements, the flow measurement functionality provided by the distributed process control system manufacturer may not be suitable for custody transfer applications. For example, the flow measurement calculations performed by distributed processing units 16, 18 of a distributed control system may not have sufficient accuracy, may not execute the most current flow calculation equations, and/or may be unable to meet regulatory requirements imposed by various legal jurisdictions with respect to metering for custody transfer.

In order to provide an overall control system that can both control the physical process and which may perform metering with sufficient accuracy for custody transfer, in the related art a separate and independent metering system 14 is provided. Any data values from the metering system 14 used by the control system 12 are exchanged by way of a communication channel 30 coupled between the two systems. In many cases, the manufacturer of the control system 12 is different than the manufacturer of the metering system 14, which makes difficult the exchange of data values between the distributed process control system 12 and the metering system 14. The same is true for other specialty systems, such as turbine control systems, diagnostic and monitoring packages, and hydrocarbon quality monitoring.

Still referring to FIG. 1, the illustrative metering system 14 comprises one or more flow computers 32 and 34. Each flow computer couples to one or more metering devices. In the illustrative case of FIG. 1, flow computer 32 couples to metering devices 36 and 38, while flow computer 34 couples to metering devices 40 and 42. The flow computers 32, 34 may thus receive either instantaneous flow values from the metering devices, or may receive raw input values from which flow values are calculated. Furthermore, the flow computers 32, 34 may accumulate (sum) the instantaneous flow values to produce total flow values over a predetermined period of time. The flow computers 32, 34 may exchange data values with each other, and other devices, by way of a backbone communication network 44. Programming and monitoring of the flow computers 32, 34 and/or any of their calculated or accumulated values may take place by way of a human/machine interface 46, which is likewise coupled to the backbone communication network 44. Further, in the illustrative situation of FIG. 1, the metering system 14 may comprise a gateway unit 48 which couples to the backbone communication network 44. In some cases, the gateway unit 48 may execute programs to ensure compliance with metrological audit requirements of any particular legal jurisdiction within which the metering system 14 operates.

As mentioned above, in many cases the manufacturer of the control system 12 is different than the manufacturer of the specialty system, such as metering system 14. Because each manufacturer operates a different protocol on their respective backbone communication networks 24 and 44, direct coupling of the backbone communication networks as between the control system 12 and illustrative metering system 14 may not be possible. Thus, FIG. 1 illustrates the situation where the gateway unit 48 not only acts to ensure compliance with metrological audit requirements, but may also be the mechanism through which data values are exchanged between the control system 12 and the metering system 14. More particularly still, in the related art the exchange of values between the control system 12 and the illustrative metering system 14 takes place over a dedicated communications channel 30 different than the backbone communication network of either system. The physical layer of the communication channel 30, as well as the communication protocol utilized, may vary. For example, the communication channel 30 may be a Modbus remote terminal unit (Modbus RTU) interface, Modbus-TCP, or an OPC Specification compliant communication channel. The communication channel 30 couples to one of the distributed processing units, such as distributed processing unit 16. The communication channel 30 is merely a channel to communicate data values, and other control-type functions cannot take place over the communication channel 30. For example, the control system 12 cannot discover the existence of particular function blocks executing in the metering system 14 over the communication channel. Since the control system 12 cannot discover such blocks, the control system cannot generate displays indicative of the function blocks, and likewise cannot implemented changes to the function blocks. Further still, the control system 12 cannot create new function blocks in the metering system 14 for execution over the communication channel 30.

While the communication channel 30 may be particularly suited for data exchange between the disparate systems, in order to configure the data exchange each manufacturer generates a list of data points to be exchanged, and the lists themselves are exchanged between manufacturers. Each manufacturer then configures its respective system to send and receive the designated data points. Moreover, the metering system 14 manufacturer creates reports, displays and initializes historian functions relating to the metering system 14, which can only be accessed/viewed within the metering system 14. Likewise, the control system manufacturer creates reports, displays and initializes historian functions with respect to metering system values, which can only be access/viewed within the control system 12. As is apparent from the discussion, there is a significant amount of duplicated effort on each side of the communication channel 30 to enable the control system 12 and specialty system (e.g., metering system 14) to exchange data values and for each system to have relevant displays and reports. Moreover, the communication channel 30 used in most situations is a serial communication channel with limited bandwidth (e.g., Modbus), and thus the amount of data that can be exchanged across the communication channel is limited.

Figure 2:
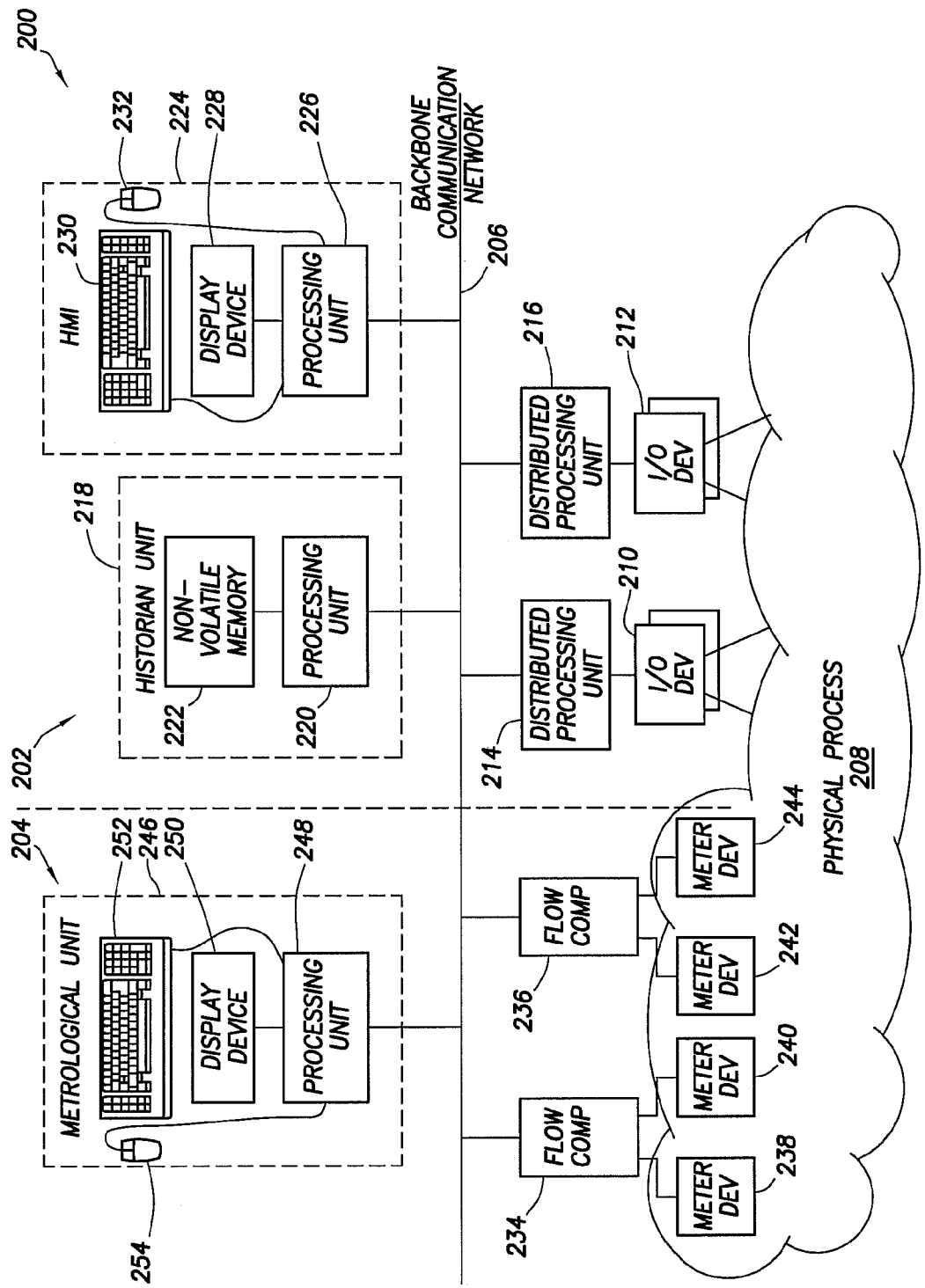
FIG. 2 shows a system in accordance with at least some embodiments.

FIG. 2 illustrates a system 200 in accordance with at least some embodiments. In particular, the system 200 comprises a control system 202 (e.g., a distributed process control system) on the right side of the dashed vertical line, and a specialty system on the left side of the dashed line, in this illustrative case the specialty system being a metering system 204. Unlike related art systems where the metering system and control system couple by way of a communication channel limited only to data value exchange, and whose bandwidth may be significantly less than the backbone communication network, the control system 202 and the illustrative metering system 204 share a backbone communication network 206. This specification first discusses in detail the various components of the overall system 200 of FIG. 2, and then discusses aspects of the illustrative metering system 204, which include the ability of the metering system 204 to share a backbone communication network 206 as shown in FIG. 2 with control systems from a plurality of different control system manufacturers, and thus a plurality of different communication protocols.

FIG. 2 illustrates a physical process 208. The physical process 208 may be any physical process which utilizes a control system to monitor and manage the process. For example, the physical process 208 may be various subsystems of power plant, the various subsystems of a hydrocarbon processing facility, an industrial plant that makes consumer products, or the various ovens, conveyors and mixers of a food processing plant. Regardless of the precise nature of the physical process 208, the temperature transmitters, pressure transmitters, valve positioners, valve position indicators, motor control systems, and other physical objects related to the physical process 208 couple to input/output (I/O) devices of the control system 202. In the illustrative system of FIG. 2, two sets of I/O devices 210 and 212 are shown; however, any number of I/O devices may be incorporated within the control system 202. The devices that interface directly with the physical process 208 (e.g., temperature transmitters, pressure transmitters, valve positioners, and the like) may communicate to the I/O devices 210, 212 in any suitable protocol. For example, the field devices may communicate to the I/O devices 210, 212 by way of 4-20 milli-Amp (mA) loops, using the HART protocol over the same wires as a 4-20 mA loop, or using Modbus (e.g., Modbus RTU, Modbus/TCP).

Still referring to FIG. 2, the control system 202 may comprise one or more distributed processing units. In the illustrative case of FIG. 2, two distributed processing units 214 and 216 are shown; however, any number of distributed processing units may be used. In accordance with a distributed process control philosophy, each distributed processing unit 214, 216 may be placed physically close to its directly coupled I/O devices 210, 212, respectively. Moreover, the distributed processing units 214, 216 may also be placed physically close to the particular portion of the physical process 208 for which each distributed processing unit 16, 18 is responsible.

Each distributed processing unit 214, 216 executes control software relevant to its portion of the controlled physical process 10. The control software may implement Boolean-based control schemes (sometimes implemented as "ladder logic"), or the control software may perform closed-loop control of a process, such as proportional-integral-differential (PID) control loops. In yet still other embodiments, the control software may implement neural-network-based control of the physical process 208. In some industries, the distributed processing units 214, 216 may be referred to as programmable logic controllers (PLCs). The distributed processing units 214, 216 may be, for example, DeltaV™ MD Controllers available from Emerson Process Management of St. Louis, Mo.

In most situations, the data values used by control software executing on a particular distributed processing unit, and likewise the output values generated, are associated with the locally attached I/O devices. However, the illustrative distributed processing units 214, 216 may communicate with each other, and other devices, over the backbone communication network 206. Thus, data values may be exchanged between the distributed processing units to assist each of the distributed processing units in performing its assigned tasks related to the physical process 208. In accordance with at least some embodiments, the backbone communication network 206 implements an Ethernet-type network (i.e., Ethernet defining the physical and data link layers of the OSI model), with the precise protocol used for information exchange (i.e., layers above the data link layer of the OSI model) based on the particular distributed process control system manufacturer. Stated otherwise, while most distributed processing systems utilize an Ethernet-based communication network 20, each manufacturer may utilize a proprietary high level protocol suited for the vendor's particular hardware and configuration.

Still referring to FIG. 2, control system 202 in accordance with some embodiments also implements storage of historical data associated with the physical process 208. In accordance with at least some embodiments, a historian unit 218 is part of the control system 202, and the historian unit 218 is responsible for gathering and maintaining historical data values regarding the physical process 208. In particular, the historian unit 218 may comprise a processing unit 220. Coupled to the processing unit 220 is a non-volatile storage unit 222, within which the historical data values are placed. In accordance with at least some embodiments, the non-volatile storage is a hard disk drive, or possibly an array of hard disk drives operated in a fault tolerant fashion, such as a redundant array of inexpensive disks (RAID) system. In yet still other illustrative embodiments, the non-volatile storage may be any currently available or after-developed technology within which data may be stored in a non-volatile fashion, such as optical storage mediums and devices.

In some embodiments, the historian unit 218 gathers the historical data values by polling the distributed processing units 214, 216. In yet still other embodiments, the distributed processing units 214, 216 are programmed to periodically send select values of parameters to the historian unit 218. For example, data values for slowing moving process parameters may be sent by the distributed processing units 214, 216 to the historian unit 218 every minute or more, while parameters whose values change quickly may be sent to the historian unit 218 with significantly shorter time spans (e.g., two seconds or less).

The illustrative control system 202 of FIG. 2 also comprises a human/machine interface (HMI) 224. As the name implies, the human/machine interface 224 may be the mechanism by which a user interfaces with the remaining equipment of the control system 202, and in some cases the equipment of the metering system 204. For example, the human/machine interface 224 may be the mechanism by which the control loops executed in the distributed processing units 214, 216 are initialized and associated with appropriate I/O device inputs and outputs. Likewise, the human/machine interface 224 may be the mechanism by which an operator monitors and controls the physical process 208 (e.g., making set point adjustments, monitoring alarm values, changing valve positions). Further still, the human/machine interface 224 may be the mechanism by which a process engineer monitors trends of the physical process 208, and perhaps based on those trends makes changes to the tuning parameters or control strategy executed by control software of the distributed processing units 214, 216.

The human/machine interface 224 may comprise a processing unit 226, which may be similar in form and construction to the processing unit 220 of the historian unit 218. The processing unit 226 may differ from the other processing units by the type and number of application programs and/or a different operating system. Processing unit 226 couples to a display device 228, such as a cathode ray tube (CRT) or liquid crystal display (LCD) display. Finally, the human/machine interface 224 may have a keyboard 230 and the pointing device 232 coupled thereto, to enable a user to interface with the application programs executing on the processing unit 226. In alternative embodiments, the programs that implement the human/machine interface functionality may be included on the historian unit 218, thus eliminating the need for a separate human/machine interface and historian units. In some industries, the historian unit 218, and more particularly its functional ability, may be referred to as a supervisory control and data acquisition (SCADA) unit.

Still referring to FIG. 2, the specialty system, in the illustrative form of a metering system 204, comprises one or more flow computers 234 and 236. Each flow computer couples to one or more metering devices. In the illustrative case of FIG. 2, flow computer 234 couples to metering devices 238 and 240, while flow computer 236 couples to metering devices 242 and 244. The metering devices 238-244 may be devices such as ultrasonic flow meters, or orifice plate systems comprising a precision orifice plate along with pressure and temperature transmitters. The flow computers 234, 236 may thus receive either instantaneous flow values from the metering devices (in the case of ultrasonic flow meters), or may receive raw input values from which the flow values are calculated. Furthermore, the flow computers 234, 236 may accumulate (sum) the instantaneous flow values to produce total flow values over any predetermined period of time. Moreover, the flow computers 234, 236 may implement various alarm conditions (e.g., high and low flow alarms, overpressure alarms), and may further control valves to selectively place in service or remove from service meter runs (e.g., as a function of total flow). The flow computers 234, 236 may be, for example, Daniel® S600 Flow Computers available from Emerson Process Management. Moreover, the metering device 238-244 in their many forms may also be available from Emerson Process Management.

The flow computers 234, 236 may exchange data values with each other, and other devices, by way of the backbone communication network 206. Programming and monitoring of the flow computers 234, 236, and/or any of their calculated or accumulated values, may take place by way of a metrological unit 246, which is likewise coupled to the backbone communication network 206.

The metrological unit 246 may comprise a processing unit 248, which may be similar in form and construction to the processing unit 226 of the human/machine interface 224, or the processing unit 220 of the historian unit 218. The processing unit 248 may differ from the other processing units by the type and number of application programs and/or a different operating system. Processing unit 248 couples to a display device 250, such as a CRT or LCD display. Finally, the metrological unit 246 may have a keyboard 252 and a pointing device 254 coupled thereto, to enable a user to interface with the application programs executing on the processing unit 248. The metrological unit 246 may perform many functions. For example, in some embodiments the metrological unit 246 interfaces with the flow computers 234, 236 over the backbone communication network 206 to perform supervisory control over the flow computers 234, 236. In other embodiments, the flow computers 234 and 236 may be omitted, and the metrological unit 246 may communicate directly with meter devices 238-244 (such as when the meter devices are all ultrasonic flow meters) over the backbone communication network 206. In the alternative embodiments where flow computers are omitted, the metrological unit 246 may be configured to implement flow computer functionality, and as such may be considered to implement one or more virtual flow computers. Moreover, when acting as a virtual flow computer and/or performing metrological calculations and functions, the metrological unit 246 is not limited to data values obtained on the metering system 204 side of the overall system 200, and some data values may likewise be obtained from I/O devices on the control system 202 side of the overall system. Further, the metrological unit 246 may be the device which provides centralization of metering alarms and/or alerts, particularly where flow computers 234, 236 are present in the system but also when acting as a virtual flow computer. Further still, the metrological unit 246 may provide a centralization of metering data, and may further provide metering system specific functions, such as station total flow computation from underlying flow computer stream totals, mass per component totals, flow weighted averaging, long and short term metering reports, control of metrological data that may find its way to displays of the control system 202, and performance of diagnostic checks of the metering system (e.g., Daniel® MeterLink Condition Based Monitoring Suite available from Emerson Process Management). Although only one metrological unit 246 is illustrated in FIG. 2, any number of metrological units 246 may be implemented to perform the various illustrative functions.

Many legal jurisdiction (e.g., states and countries) have specific metrological audit requirements regarding metering of hydrocarbons for custody transfer. In accordance with the various embodiments, the metrological unit 246 performs supervisory control over the flow computers 234, 236, or their virtual equivalents, and also conforms the hydrocarbon metering aspects of the overall system 200 to metrological audit requirements. In particular, the metrological unit 246 may perform meter functions dictated by metrological approvals (e.g., prover alignment, prover de-alignment, regulating flow to achieve flow through each meter within a linear range). Further still, the metrological unit 246 may be the central repository for metrologically required audit trails (e.g., recording all changes in accordance with metrological requirements).

Unlike related art systems where the control system is a separate entity from the specialty system such as a metering system, in accordance with the various embodiments, and as is illustrated in FIG. 2, the components of the illustrative metering system 204 share backbone communication network 206 with the control system 202. Thus, even if the manufacturer of the control system 202 is different than the manufacturer of the illustrative metering system 204, programming, control and monitoring of the devices within the metering system 204 may be performed by users through the human/machine interface 224 on the process control 202 side of the overall system 200, or any device acting as a human/machine interface.

However, in accordance with the various embodiments, the functionality of the specialty system being the illustrative metering system 204 is more than just coupling directly to the backbone communication network of a control system from a single manufacturer. In particular, and as alluded to above, the historical momentum in the control system industry with respect to purchasing of a control system for plant control, and purchasing of specialty systems such as hydrocarbon metering systems and turbine control systems, is that the manufacturer of the control system need not be, and in most cases is not, the same as the manufacturer for the specialty system. Specialty systems such as metering systems 204, in accordance with various embodiments, are designed and constructed to couple to the backbone communication network of a plurality of control systems from different manufacturers.

Figure 3:
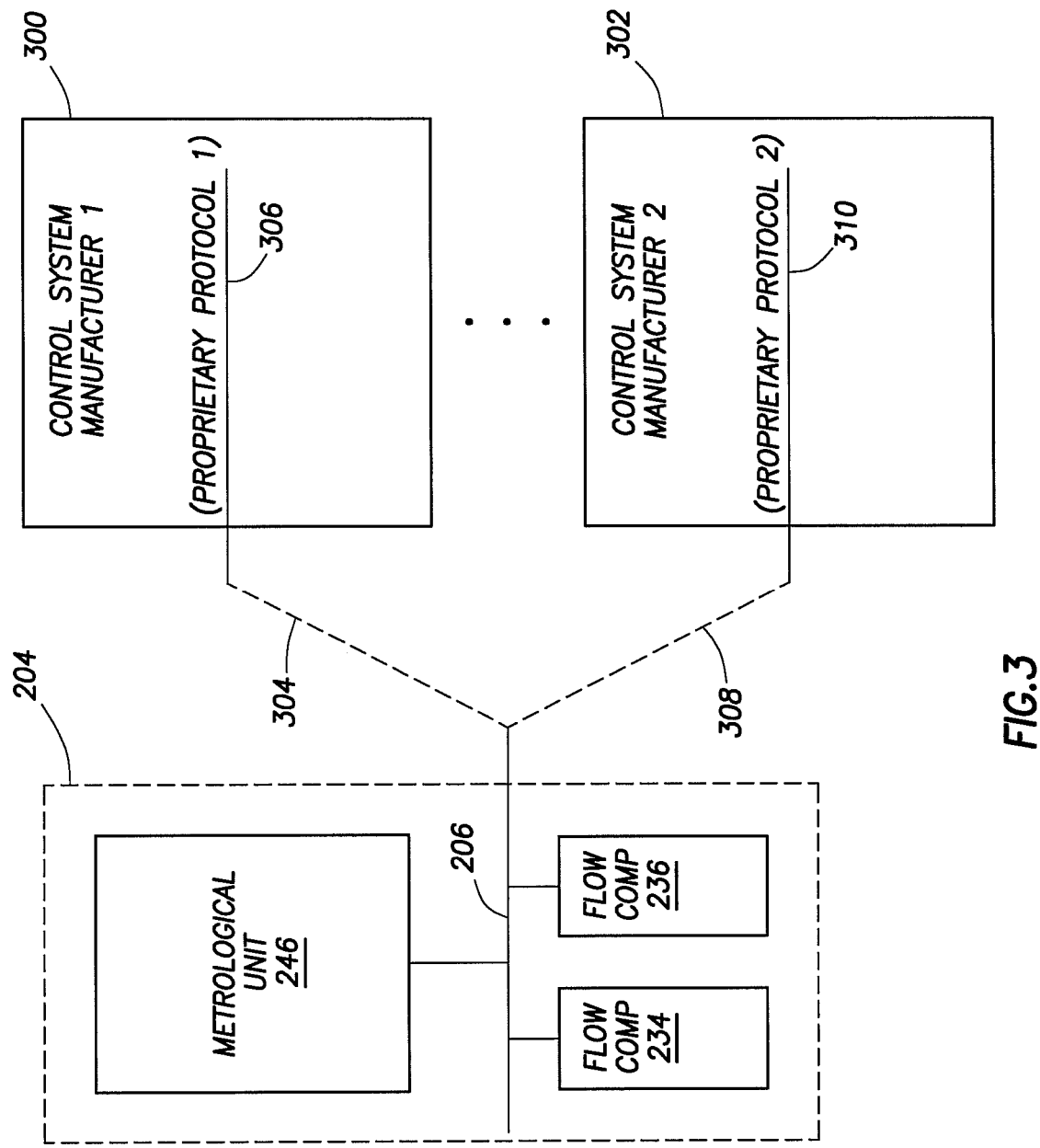
FIG. 3 illustrates a metering system coupling to the backbone communication network of a plurality of control systems.

FIG. 3 illustrates the ability of the illustrative metering system 204 to couple to a plurality of control systems from different manufacturers. In the illustrative case of FIG. 3, two such controls systems 300 and 302 are illustrated; however, a metering system 204 in accordance with the various embodiments may couple to two or more control systems from different manufacturers. In particular, FIG. 3 shows that the illustrative metering system 204 implements backbone communication network 206. As shown by dashed line 304, the backbone communication network 206 may couple to the backbone communication network 306 of the control system 300 produced by a first manufacturer. The first manufacturer may implement a proprietary protocol on the backbone communication network 306. For example, the backbone communication network 306 may implement an Ethernet-type physical and data link layer, but the manufacturer may use a proprietary protocol for the layers above the data link layer in the OSI model.

Still referring to FIG. 3, the illustrative metering system 204 is likewise shown to selectively couple to the second control system 302 by way of the dashed line 308. Much like control system 300, control system 302 has a backbone communication network 310 to which the backbone communication network 206 of the meter system 204 may couple. The backbone communication network 310 of the control system 302 may implement an Ethernet-type physical and data link layer, but the manufacturer may use proprietary protocol for the layers above the data link layer in the OSI model. It should be understood, in reference to FIG. 3, that the metering system 204 does not simultaneously couple to two or more control systems; rather, the metering system 204 is programmed and configured to couple to two or more control systems from different manufacturers and to implement different communication protocols, but the metering system 204 only couples to one control system at any one time.

In accordance with the various embodiments, the illustrative metering system 204 is designed and programmed to participate as a processing unit within each of the illustrative control systems 300 and 302, in spite of the fact that the illustrative control system 300 (of a first manufacturer) and control system 302 (of a second manufacturer, different than the first manufacturer) may implement different (and in some cases proprietary) protocols on their backbone communication networks 306 and 310, respectively. In participating as a processing unit, for example, the programming of the flow computers 234, 236, and likewise the programming and control of metrological audit functions performed by the metrological unit 246, may be discovered, may be visualized through graphics displays, and may be modified by a user, all through the human/machine interface 224 of the control system. Further still, the historian functions provided by the historian unit 218 of the control system 202 may track and "historize" the data values associated with data points of any of the flow computers 234, 236 or the metrological unit 246 on the metering system 204 side of the overall system 200. In summary, in the embodiments shown in FIG. 2, the processing units on the metering system 204 side (i.e., flow computers 234, 236 and processing unit 248 of the metrological unit 246) participate as processing units of the control system 300, 302. By operating in this fashion, the duplication of engineering effort regarding creation of reports and historian functions, as well as the engineering associated with the exchange of data between the two systems, is enormously reduced, if not eliminated.

The precise mechanism by which the metering system 204 participates as a processing unit of the attached control system 300, 302 will be specific, and most likely unique, to each control system as a function of the control system manufacturer. Thus, the specification now turns to illustrative mechanisms by which the metering system 204 may participate as processing unit of the control system, though such mechanisms may not be implemented in every case. The discussion the illustrative mechanism starts with creation and modification of function blocks.

In some embodiments, the similarities of the specialty system and the control system may enable the control system to directly discover, visualize on a display, create, modify and delete function blocks implemented in the specialty system. However, in other embodiments the human/machine interface of the attached control system 300, 302 may be unable to reach directly into either the metrological unit 246 or the flow computers 234, 236 for programming purposes. In these embodiments, programming of certain aspects of the metrological unit 246 and/or the flow computers 234, 236 may be by proxy by way of distributed processing unit of the attached control system 300, 302. In particular, in the embodiments where a human/machine interface of the control system 300, 302 cannot directly reach portions of the metering system 204 for programming purposes, the human/machine interface may do the programming by way of a distributed processing unit within the control system 300, 302. For example, each distributed processing unit of the attached control system 300, 302 may have, or may be provided, a set of function blocks which may be inserted into the control scheme executed in a distributed processing unit. The insertion of the function block may be, for example, by way of the IEC 61131-3 Function Block specification. However, in these embodiments the function blocks implemented in a distributed processing unit of the control system 300, 302 (as proxies for devices in the meter system 204) may not perform any control functions. Rather, the function blocks may be selected, and the various data points associated therewith, but the function blocks do not instantiate any software to perform control. Rather, the metering system 204, such as the metrological unit 246, is configured to periodically scan the distributed processing units of the attached control system 300, 302. When one of the function blocks associated with the metering system 204 is found in a distributed processing unit of the attached control system 300, 302, the metrological unit 246 implements a shadow function block in a processing unit of the metering system 204 which actually instantiates the software to perform the control intended. Stated otherwise, the "dummy" function blocks of the attached control system 300, 302 are used to inform the metrological unit 246 that the user of the control system 300, 302 desires particular functionality, and in response the metrological unit 246 actually implements the control indicated by the selected type of function block and on the data points identified in the function block of the distributed processing unit of the control system 300, 302.

In yet still other embodiments, the scanning for "dummy" function blocks and implementation may be performed by any portion of the metering system 204, including the flow computers 234, 236, the metrological unit 246, or a processing unit of the metering systems specifically designated for the purpose of scanning processing units of the attached control systems, 300, 302 and implementing shadow function blocks as noted.

In yet still other embodiments, while the specialty system being the illustrative metering system 204 and control system 202 may share the backbone communication network 206, certain aspects of the programming of the metering system 204 may not be programmed in the same sense as the "programming" of the control system 202 (i.e., function blocks). Moreover, in some situations the metrological audit requirements may dictate segregation of data as between systems to ensure data integrity of the metrological audit data. In situations where the systems are not fully integrated (whether because of incompatibilities or to meet metrological audit requirements), a separate programming interface or interfaces may be used for the metering system. The separate programming interface need not, however, be substantially different as between the two systems. Thus, programming of the specialty system by way of the separate programming interface may be similar in form and function to programming within the control system, such as using function blocks, and tying inputs of the functions blocks to data points such as by drag-and-drop configurations, and in some embodiments in conformance with the IEC 61131-3 Function Block specification.

It is anticipated that in spite of the fact some if not all data points of the specialty system may be maintained by the specialty system (e.g., to meet metrological audit requirements), the data points may likewise be data points used and tracked by the control system. Stated otherwise, programming changes made on the metering system 204 may need to be reflected or synchronized in the control system 300, 302 (e.g., updating of "dummy" control blocks on the control system 202 side to reflect programming on the metering system 204 side). Most control system manufacturers have, in addition to the graphical programming using function blocks, a bulk edit feature. The bulk edit feature enables creation of a "flat" or ASCII file that contains the various data points, how the data points are tied to function blocks, and other features of the control system. In accordance with at least some embodiments, programming changes and additions on the specialty system side are implemented on the control system side by use of the bulk edit feature. In particular, the separate programming interface in accordance with at least some embodiments propagates changes made on the specialty system side using the bulk edit feature of the control system. The changes are made to the bulk edit flat file by the separate programming interface to reflect changes, and then the flat file is re-installed on the control system side to implement changes on the control system side. The specification now turns to user displays which provide a visual picture of function blocks, and how the function blocks are connected to other function blocks and/or data points.

Other than making changes by way of the flat file noted above, most programming, tuning and changes performed to the control schemes of a control system are by way of displays shown on display devices, such as display device 228 of the human/machine interface 224 (FIG. 2). When the human/machine interface 224 queries a distributed processing unit 214, 216 for information regarding function block, the processing unit 214, 216 returns an indication of the function block, the various data points coupled to the function block, and the current settings of the parameters of the function (e.g., PID parameters). Upon receiving the information, the human/machine interface 224 recognizes the function block type, generates a display corresponding to the function block type, and populates the display with the information provided by the distributed processing unit 214, 216. However, the function blocks implemented in the specialty system may not be known to the control system, and thus the specification now turns to illustrative mechanism to transfer displays between a specialty system (e.g., metering system 204) and the control system 202.

In some embodiments, when a user on the control system 202 side requests a display related to function blocks implemented on the metering system 204 side, the metering system provides the displays themselves, rather than just an indication, in one of several forms. For example, in some embodiments when a request is made the displays are provided in hypertext markup language (HTML) to the control system 202 across the backbone communication network, which then generates the visualization by way of a browser window on the display device 228. Using HTML to provide displays between the systems may work well for "snapshot"-type displays, but where the user desires to see real-time or near-real-time indications of the status of the process, HTML may be insufficient, even if the HTML is updated frequently.

In yet still other embodiments, when a request is made by a user the displays are provided by way of ActiveX modules sent across the backbone communication network. ActiveX is component object module (COM) run within another program on the receiving end, such as a web browser. Thus, upon request, the metering system may send ActiveX components, either alone or along with HTML code. The human/machine interface 224, receiving ActiveX components, executes the components, and in the execution the of the ActiveX components functionality is provided, such as showing real time data values of a process parameter (i.e., the ActiveX components facilitate data value transfer), or updating process parameters (e.g., PID settings, with the ActiveX facilitating communication to make requested changes). Similarly, the specialty system may provide execute Java code or Java Applets to provide the functionality associated with the displays.

In yet still other embodiments, when a request is made by a user the displays are provided from the specialty system to the control system by way of standalone executable programs across the backbone communication network. That is, a standalone program is transferred across the backbone communication network. Once received the human/machine interface 224 executes the program, and the program then gathers the pertinent information, generates the displays, and drives the displays to the display device.

One point to keep in mind is that transferring of executable code (either directly executable, or interpreters such as Java and/or ActiveX) is not supported by the various protocols for communication to I/O devices, such as Modbus Modbus RTU, Modbus-TCP, or an OPC Specification compliant communication channel.

Figure 4:
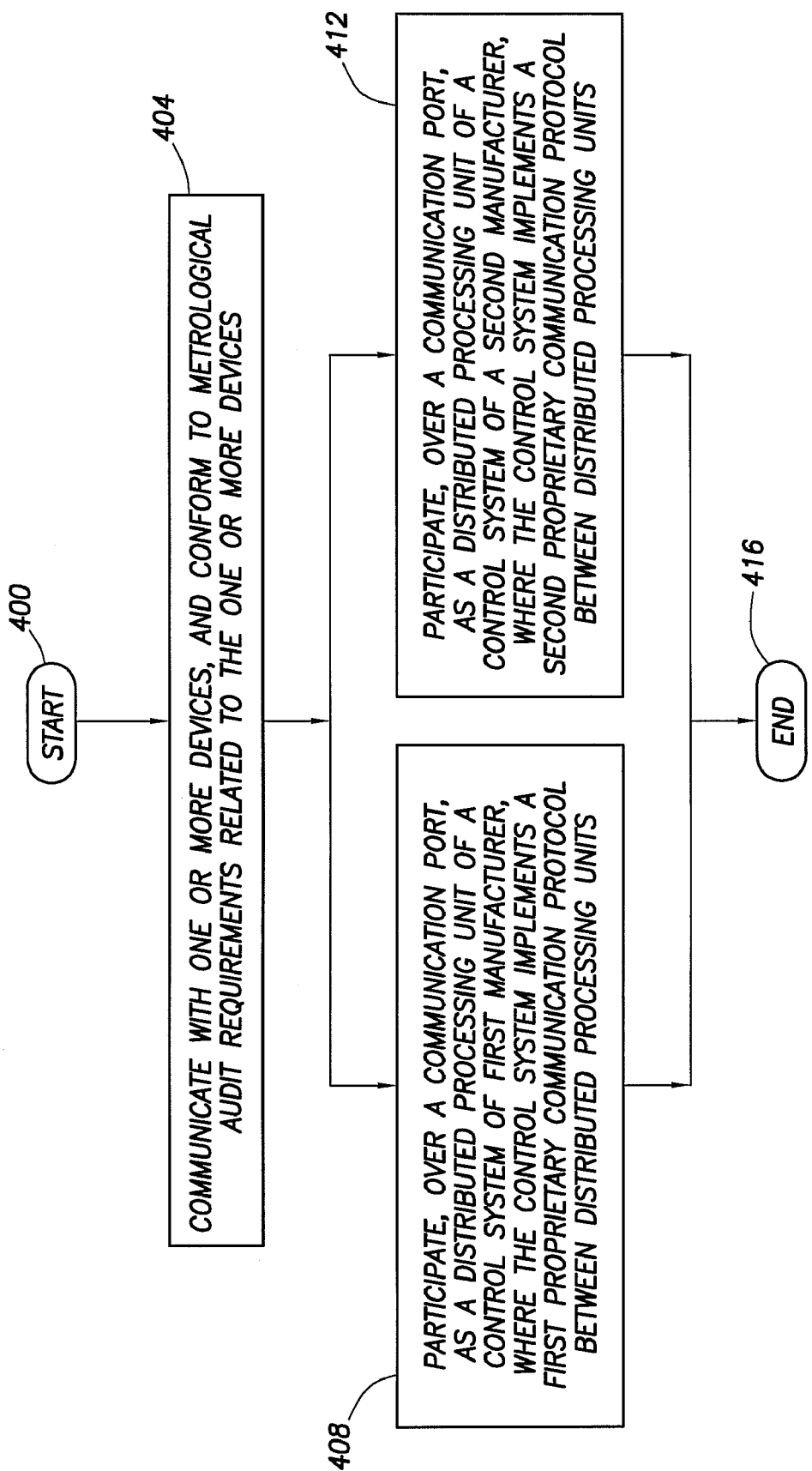
FIG. 4 shows a computer-implemented method in accordance with at least some embodiments.

FIG. 4 illustrates a computer-implemented method in accordance with at least some embodiments. In particular, the method starts (block 400) and proceeds to communicating with one or more devices, and conforming to metrological audit requirements regarding the one or more devices (block 404). In some embodiments, the one or more device are actual or virtual flow computers, and in other embodiments the devices are any devices for which legal jurisdictions place metrological audit requirements, such as hydrocarbon quality monitoring systems. The illustrative method then proceeds along one of at least two possible parallel paths, depending on the control system to which the processor implementing the method attaches. In the first parallel path, the method involves participating, over a communication port, as a processing unit of a control system of first manufacturer, where the control system implements a first proprietary communication protocol between distributed processing units (block 408). In the second parallel path, the method involves participating, over the communication port, as a processing unit of a control system of a second manufacturer, where the control system implements a second proprietary communication protocol between distributed processing units (block 412). The path select depends on the type of system to which the processor implementing the method attaches. Thereafter, the illustrative computer implemented method ends (block 416).

Figure 5:
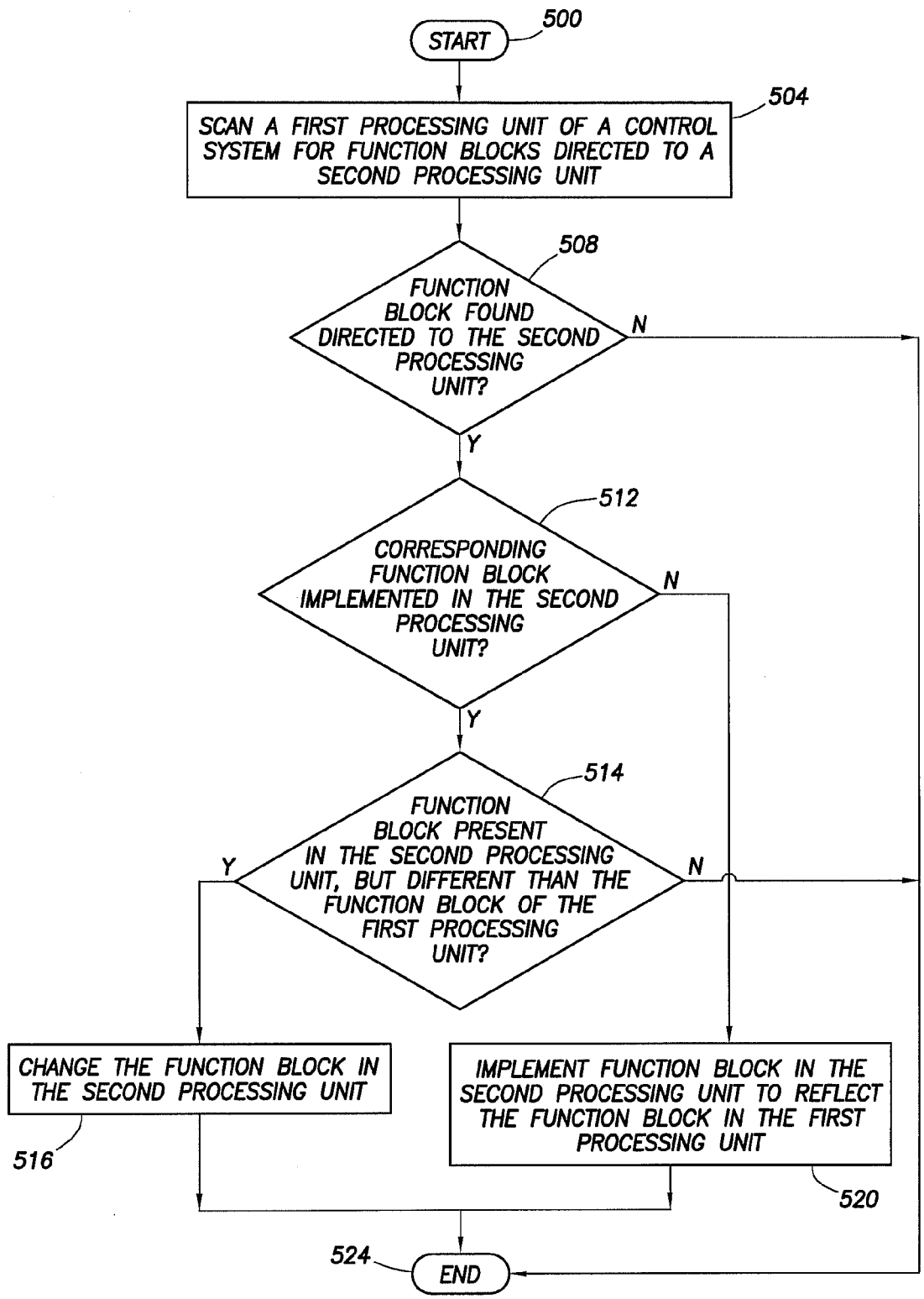
FIG. 5 shows a computer-implemented method in accordance with at least some embodiments.

FIG. 5 illustrates a computer-implemented method in accordance with the scanning and implementing aspects when human/machine interfaces of the control system cannot directly program processing units of an attached specialty system, such as a metering system, turbine control systems, diagnostic and monitoring packages, or hydrocarbon quality monitoring system. In particular, the method starts (block 500) and proceeds to scanning a first processing unit of control system for function blocks directed to a second processing unit (block 504) (e.g., a processing unit of a metering system). If a function block is found in the first processing unit directed to the second processing unit (block 508), a determination is made as to whether a corresponding function block is located in the second processing unit (block 512). If no corresponding function block exists in the second processing unit (again block 512), then a function block is implemented in the second processing unit (e.g., a metering system) to reflect the function block in the control system (block 520), and the illustrative method ends (block 524). In many cases, the corresponding function blocks may already exist in the second processing unit (again block 512), and thus the illustrative method moves to a determination of whether the function block present second processing (e.g., a metering system) unit is different than the first function block in the control system (block 514). If a difference exists between the corresponding function blocks (again block 514), then the function block in the second processing unit is changed to match the first function block in the control system (block 516), and the illustrative method ends (block 524). If no function blocks exist in the first processing unit of the control system (again block 508), or if the function blocks in the second processing unit match the function blocks in the control system (again block 514), then the illustrative method ends (block 524). However, it is anticipated that scanning and implementation takes place on a continuous basis within.

Moreover, to the extent a function block directed to the second processing unit (e.g., a metering system) is removed from the control system, the illustrative method also comprises determining that one or more function blocks reside in the second processing unit for which no corresponding function blocks reside in the control system, and removing the function blocks from the second processing unit.

Figure 6:
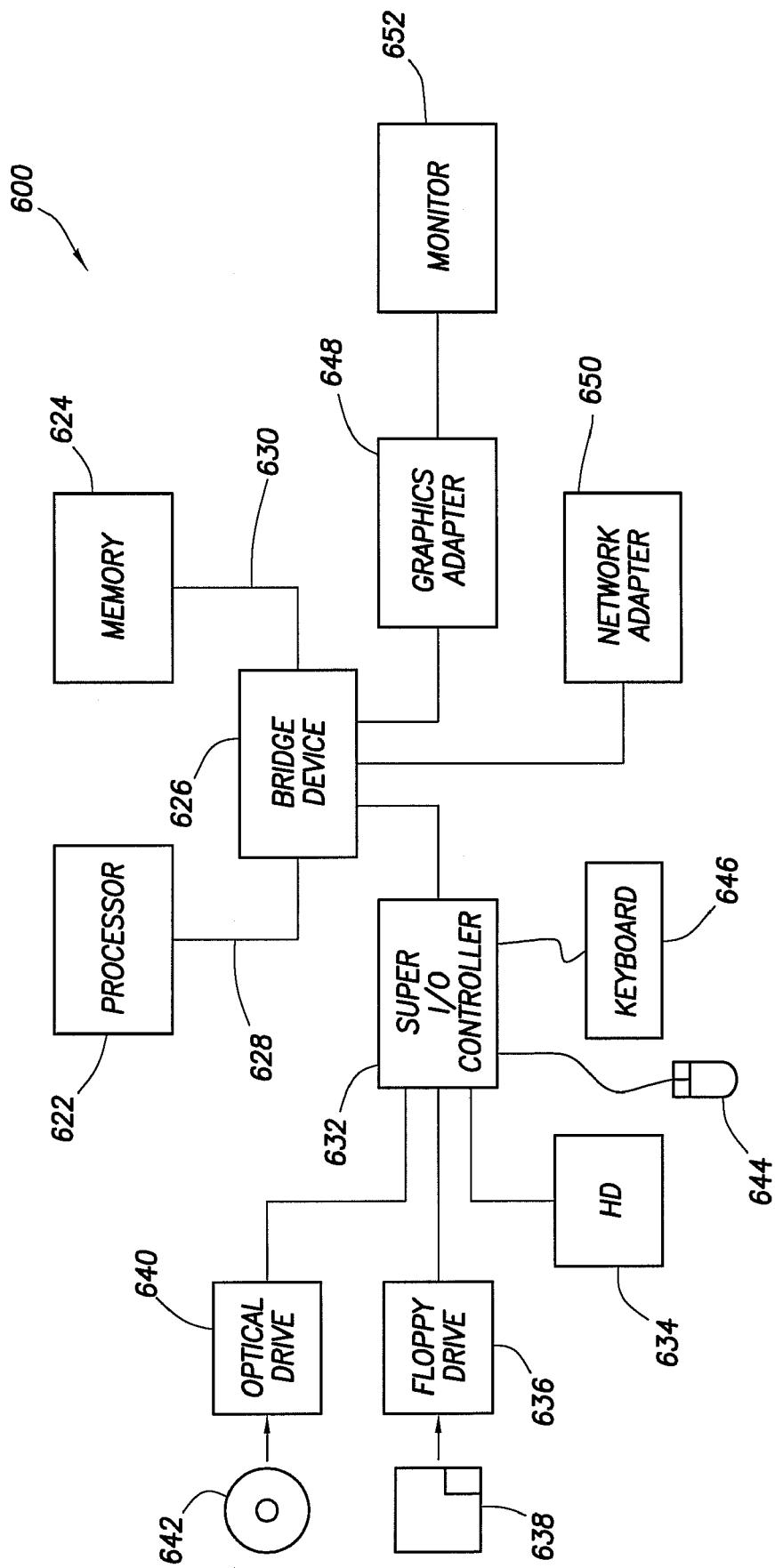
FIG. 6 shows a processing unit in accordance with at least some embodiments.

FIG. 6 illustrates a processing unit 600 in accordance with at least some embodiments. The processing unit 600 could be any of the processing units of FIG. 2, such as the distributed processing units 214, 216, the processing unit 226 (associated with the human/machine interface 218), the processing unit 220 (associated with the historian unit 218), processing unit 248 (associated with the metrological unit 246), the flow computers 234, 236, or any other processing unit that may be implemented in the control system 200. In particular, the processing unit 600 comprises a processor 622 coupled to a memory device 624 by way of a bridge device 626. Although only one processor 622 is shown, multiple processor systems, and system where the "processor" has multiple processing cores, may be equivalently implemented. The processor 622 may be any currently available or after-developed processor, such as processors available from AMD of Sunnyvale, Calif., or Intel of Santa Clara, Calif.

The processor 622 couples to the bridge device 626 by way of a processor bus 628, and memory 624 couples to the bridge device 626 by way of a memory bus at 630. Memory 624 is any volatile or any non-volatile memory device, or array of memory devices, such as random access memory (RAM) devices, dynamic RAM (DRAM) devices, static DRAM (SDRAM) devices, double-data rate DRAM (DDR DRAM) devices, or magnetic RAM (MRAM) devices.

The bridge device 626 comprises a memory controller and asserts control signals for reading and writing of the memory 624, the reading and writing both by processor 622 and by other devices coupled to the bridge device 626 (i.e., direct memory access (DMA)). The memory 624 is the working memory for the processor 622, which stores programs executed by the processor 622 and which stores data structures used by the programs executed on the processor 622. In some cases, the programs held in the memory 624 are copied from other devices (e.g., hard drive 634 discussed below or from other non-volatile memory) prior to execution.

Bridge device 626 not only bridges the processor 622 to the memory 624, but also bridges the processor 622 and memory 624 to other devices. For example, the illustrative processing unit 600 may comprise an input/output (I/O) controller 632 which interfaces various I/O devices to the processing unit 600. In the illustrative processing unit 600, the I/O controller 632 enables coupling and use of non-volatile memory devices such as a hard drive (HD) 634, "floppy" drive 636 (and corresponding "floppy disk" 638), an optical drive 640 (and corresponding optical disk 642) (e.g., compact disk (CD), digital versatile disk (DVD)), a pointing device or 644, and a keyboard 636. In the case of processing unit 600 being a processing unit associated with the human/machine interface 224, the keyboard 646 and pointing device 644 may correspond to the keyboard 230 and pointing device 232, respectively, of FIG. 2. In the case of processing unit 600 being a processing unit associated with the metrological unit 246, the keyboard 646 and pointing device 644 may correspond to the keyboard 252 and pointing device 254, respectively, of FIG. 2. In situations where the processing unit 600 of FIG. 6 is a distributed processing unit 214, 216, flow computer 234, 236, or processing unit 220 associated with historian unit 22, the keyboard 646 and pointing device 644 may be omitted. In the case of processing unit 600 being distributed processing unit 214, 216, flow computers 234, 236, additionally the hard drive 634, floppy drive 636 and optical drive 640 may be omitted. Further still, in the case of processing unit 600 being the processing unit 220 associated with the historian unit 218, the I/O controller 632 may be replaced by a multiple drive controller, such as a drive controller for a RAID system.

Still referring to FIG. 6, the bridge device 626 further bridges the processor 622 and memory 624 to other devices, such as a graphics adapter 648 and communication port or network adapter 650. Graphics adapter 648, if present, is any suitable graphics adapter for reading display memory and driving a display device or monitor 652 with graphic images represented in the display memory. In some embodiments, the graphics adapter 648 internally comprises a memory area to which graphic primitives are written by the processor 622 and/or DMA writes between the memory 624 and the graphics adapter 648. The graphics adapter 648 couples to the bridge device 626 by way of any suitable bus system, such as peripheral components interconnect (PCI) bus or an advance graphics port (AGP) bus. In some embodiments, the graphics adapter 648 is integral with the bridge device 626. The human/machine interface 224 and the metrological unit 246 of FIG. 2 may each comprise the graphics adapter, while the distributed processing units 214, 216 (associated with the historian unit 218), and flow computers 234, 236 may omit the graphics adapter.

Network adapter 650 enables the processing unit 600 to communicate with other processing units over the backbone computer network 206 (FIG. 2). In some embodiments, the network adapter 650 provides access by way of a hardwired connection (e.g., Ethernet network), and in other embodiments the network adapter 650 provides access through a wireless networking protocol (e.g., IEEE 802.11(b), (g)).

As discussed above, when the illustrative processing unit 600 is associated with the human/machine interface 224, the processing unit 600 may be the computer through which a user interacts with the distributed processing units 214, 216 or the metrological unit 246 (e.g., to program the control loops related to the physical process), and also to communicate with the historian unit 218. Moreover, programs implemented and executed to perform the illustrative methods discussed above may be stored and/or executed from any of the computer-readable storage mediums of the illustrative processing unit 600 (e.g., memory 624, optical device 642, "floppy" device 638 or hard drive 634).

From the description provided herein, those skilled in the art are readily able to combine software created as described with appropriate general-purpose or special-purpose computer hardware to create a computer system and/or other computer subcomponents in accordance with the various embodiments, to create a computer system and/or computer subcomponents for carrying out the methods for various embodiments, and/or to create a computer-readable storage medium or mediums for storing a software program to implement the method aspects of the various embodiments.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A processing unit comprising:
a processor;
a memory coupled to the processor; and
a communication port coupled to the processor, the communication port configured to couple to a backbone communication network of a control system;
wherein the memory stores programs that, when executed by the processor, cause the processor to selectively:
participate, over the communication port, as a processing unit of a control system of a first manufacturer, the control system implements a first proprietary communication protocol between processing units; and
participate, over the communication port, as a processing unit of a control system of a second manufacturer, different than the first manufacturer, the control system of the second manufacturer implements a second proprietary communication protocol between processing units, and the second proprietary communication protocol is different than the first proprietary communication protocol;
conform to metrological audit requirements by at least one selected from the group consisting of: perform a prover alignment, perform a prover de-alignment; regulate flow to achieve flow through two or more flow meters to be with a predetermined range; record all changes to parameters related to hydrocarbon metering.

2. The processing unit of claim 1 wherein when the programs participate, the programs cause the processor to scan a processing unit of the control system for creation of a function block, and to create a corresponding function block within the processing unit and execute the function block.

3. The processing unit of claim 1 wherein when the programs participate, the programs cause the processor to be directly programmable by a human/machine interface of the control system.

4. The processing unit of claim 3 wherein when the processor is directly programmable by the human/machine interface, the programs further cause the processor to accept programming in conformance with International Electric Commission (IEC) standard 61131-3.

5. The method of claim 1 wherein the programs, when executed by the processor, further cause the processor to at least one selected from the group consisting of: perform hydrocarbon metering; control a turbine; perform diagnostic and monitoring services; and perform hydrocarbon quality monitoring.

6. A hydrocarbon metering system, comprising:
a processor;
a memory coupled to the processor; and
a communication port coupled to the processor, the communication port configured to couple to a backbone communication network of a control system;
the memory stores programs that, when executed by the processor, causes the processor to:
communicate with one or more flow computers;
perform hydrocarbon metering based on the communication with the one or more flow computers; and
selectively:
participate, over the communication port, as a processing unit of a control system of a first manufacturer, the control system implements a first proprietary communication protocol between processing units, and the control system configured to control a physical process involving hydrocarbon flow; and
participate, over the communication port, as a processing unit of a control system of a second manufacturer, different than the first manufacturer, the control system of the second manufacturer implements a second proprietary communication protocol between processing units, the second proprietary communication protocol is different than the first proprietary communication protocol, and the control system of the second manufacturer configured to control a physical process involving hydrocarbon flow
wherein when the programs participate, the programs cause the processor to:
scan a distributed processing unit of the control system executing function blocks that control at least a portion of a physical process, the scanning to identify a function block directed to data points of the metering system; and if a function block directed to data points of the metering system is found
create a corresponding function block within the hydrocarbon metering system and execute the function block.

7. The hydrocarbon metering system of claim 6 wherein when the programs participate, the programs cause the processor to be directly programmable by a human/machine interface of the control system.

8. The hydrocarbon metering system of claim 6 wherein when the processor is directly programmable by the human/machine interface, the programs further cause the processor to accept programming in conformance with International Electric Commission (IEC) standard 61131-3.

9. A processing unit comprising:

a processor;

a memory coupled to the processor; and a communication port coupled to the processor, the communication port configured to couple to a backbone communication network of a control system;

wherein the memory stores programs that, when executed by the processor, cause the processor to selectively:

participate, over the communication port, as a processing unit of a control system of a first manufacturer, the control system implements a first proprietary communication protocol between processing units; and participate, over the communication port, as a processing unit of a control system of a second manufacturer, different than the first manufacturer, the control system of the second manufacturer implements a second proprietary communication protocol between processing units, and the second proprietary communication protocol is different than the first proprietary communication protocol;

wherein the first proprietary communication protocol and the second proprietary communication protocol have identical physical and data link layers of the open systems interconnection (OSI) model, but implement different layers above the data link layer of the OSI model.

10. The processing unit of claim 9 wherein when the programs participate, the programs cause the processor to scan a processing unit of the control system for creation of a function block, and to create a corresponding function block within the processing unit and execute the function block.

11. The processing unit of claim 9 wherein when the programs participate, the programs cause the processor to be directly programmable by a human/machine interface of the control system.

12. The processing unit of claim 11 wherein when the processor is directly programmable by the human/machine interface, the programs further cause the processor to accept programming in conformance with International Electric Commission (IEC) standard 61131-3.

13. The method of claim 9 wherein the programs, when executed by the processor, further cause the processor to at least one selected from the group consisting of: perform hydrocarbon metering; control a turbine; perform diagnostic and monitoring services; and perform hydrocarbon quality monitoring.

* * * * *